G. W. COMER.
VEHICLE SIGNAL.
APPLICATION FILED APR. 30, 1915.

1,237,019.

Patented Aug. 14, 1917.
3 SHEETS—SHEET 1.

Witnesses:
Leonard E. Bogue
G. A. Olson

Inventor
Guy W. Comer
By Joshua H. Potts
his Attorney.

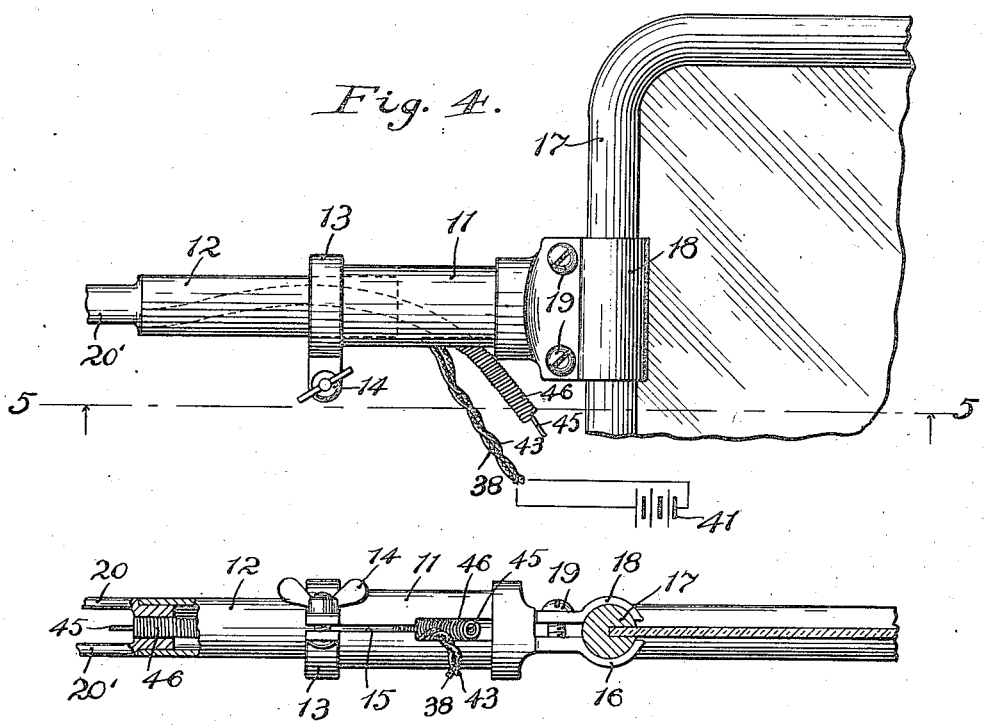
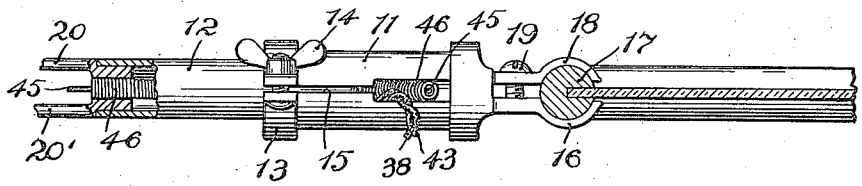
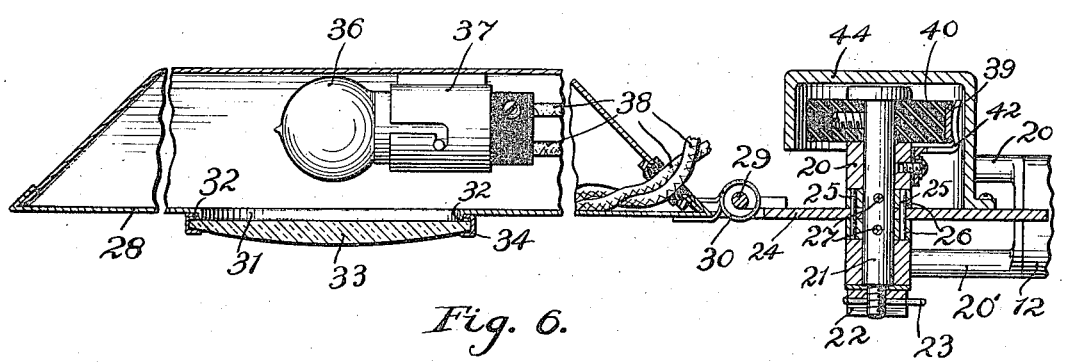

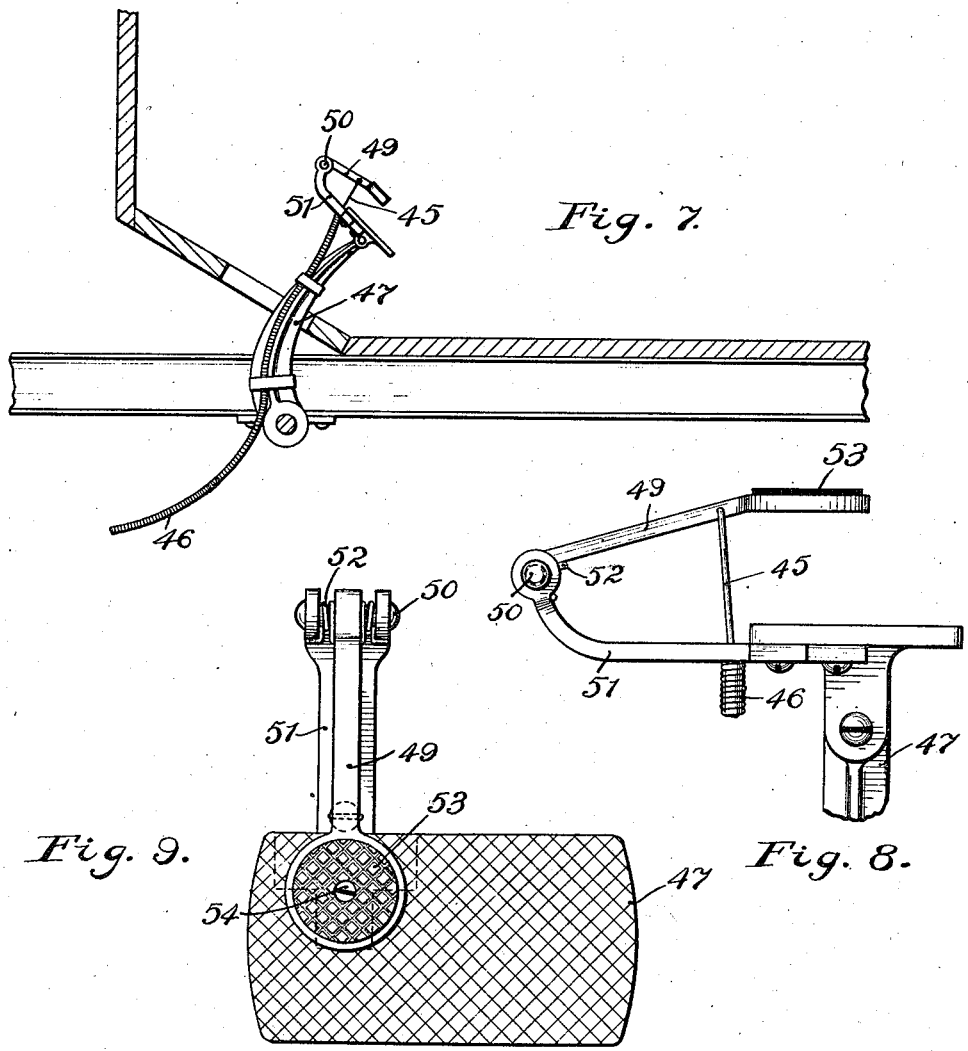

UNITED STATES PATENT OFFICE.

GUY W. COMER, OF CHICAGO, ILLINOIS, ASSIGNOR TO AUTO-SIGNAL CO., OF CHICAGO, ILLINOIS, A CORPORATION OF ILLINOIS.

VEHICLE-SIGNAL.

1,237,019.

Specification of Letters Patent.   Patented Aug. 14, 1917.

Application filed April 30, 1915.   Serial No. 24,972.

*To all whom it may concern:*

Be it known that I, GUY W. COMER, a citizen of the United States, and a resident of the city of Chicago, county of Cook, and State of Illinois, have invented certain new and useful Improvements in Vehicle-Signals, of which the following is a specification.

My invention relates to improvements in vehicle signals designed for use especially upon automobiles to indicate to the drivers of other vehicles the intentions of the driver of the vehicle upon which the device is used, as to the control of his vehicle.

The object of my invention is the production of a signaling device as mentioned which will be of economical construction, one which may be readily and easily operated, and one which will be efficient in use.

A further object is the production of mechanism of the character mentioned which may be readily and easily applied to any automobile.

Other objects will appear hereinafter.

The invention consists in the combinations and arrangements of parts hereinafter described and claimed.

Figure 1:
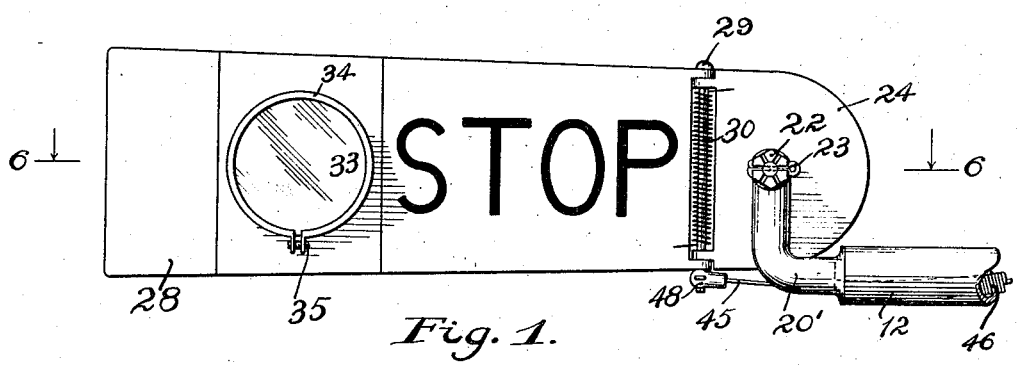
Figure 2:
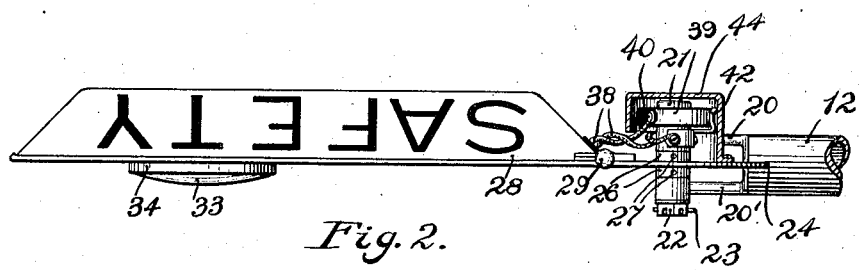
Figure 3:
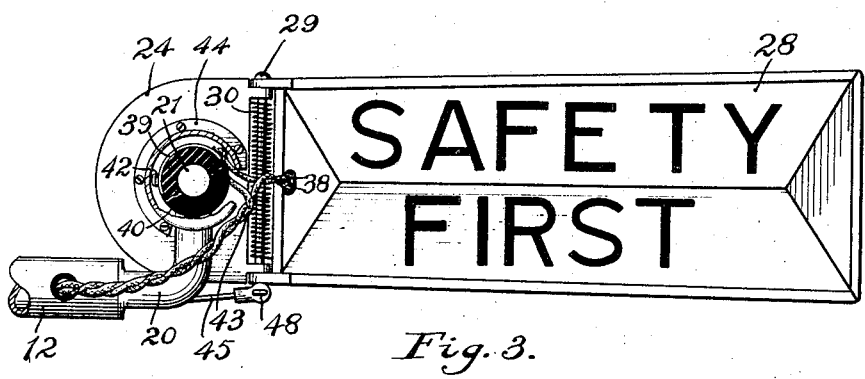

The invention will be best understood by reference to the accompanying drawings forming a part of this specification, and in which, Figure 1 is a rear elevation of the signaling member of the device and the supporting bracket therefor of a signaling device embodying the invention, Fig. 2 is a partially sectional top plan view of the construction shown in Fig. 1, Fig. 3 is a partially sectional front elevation of the construction shown in Fig. 1, Fig. 4 is a side elevation of the supporting bracket of the device showing the application thereof to the wind shield of an automobile, Fig. 5 is a section taken on line 5—5 of Fig. 4, Fig. 6 is an enlarged fragmental section taken on line 6—6 of Fig. 1, Fig. 7 is a fragmental section through the body of the vehicle in connection with which the device is employed, showing the connection of the signal member operating pedal with the brake pedal of the automobile, Fig. 8 is an enlarged detail side elevation of a portion of the construction shown in Fig. 7, and Fig. 9 is a top plan view of the construction shown in Fig. 8.

The preferred form of construction, as illustrated in the drawings, comprises a supporting bracket consisting, as clearly shown in Figs. 4 and 5, of tubular telescoping sections 11 and 12, the arrangement being such as to permit of longitudinal adjustment of the bracket through relative sliding of said sections. Said sections are locked in positions of adjustment by means of a split band 13 provided at the outer end of section 11 with the ends of which coöperates a bolt and coöperating thumb nut 14. The section 11 is slitted as at 15, as shown in Fig. 5, to permit of the desired contraction of the section 11 in the clamping of the same to section 12. At the rearward end of section 11 is provided a jaw 16 adapted for engagement with one of the side bars 17 of the wind shield of the automobile in connection with which the device is employed. Coöperating with the jaw 16 is a movable jaw 18 adjustably connected with the jaw 16 by means of screws 19.

Provided at the outer end of the section 12 are angularly formed fork-arms 20 and 20′ in which is rockingly mounted a horizontally disposed spindle 21, said spindle being locked against longitudinal movement by means of a nut 22 and a coöperating cotter pin 23.

Upon the spindle 21 is mounted an elongated signaling member or arm comprising a rearward section 24 which is fixed to spindle 21 by means of pins 25 which engage with washers or collars 26, the latter in turn being locked to said spindle by means of pins 27, as clearly shown in Fig. 6. The outer section 28 of the signaling member is swingingly connected at 29 with the section 24 so as to permit of swinging of the former in a horizontal plane. A helical torsional spring 30 coöperates with the section 28 to normally yieldingly hold the same in extended position, that is, in alinement with the section 24. With this arrangement, it will be seen that in case of the outer end of the signaling member striking an obstruction, the section 28 will yield and thus prevent breaking or bending of the same, as might otherwise result.

The section 28 is hollow and in the rear wall thereof is formed a circular opening 31 and projecting outwardly from the edges of said opening is an annular flange 32, angular in cross section. Arranged over said opening is a lens 33 preferably colored red which is removably secured in position by means of a split channel ring 34 which embraces the periphery of said lens and the outer edge portion of the flange 32, as clearly shown in Fig. 6. A screw 35 coöperates with the ends of the ring 34 for holding the same in operative relation. With this arrangement, it will be seen that removal of the lens may be readily and easily effected by detachment of the screw 35 and flexing of the ends of the ring 34 to disengage the same from flange 32.

Arranged within the section 28 in registration with the opening 31 is an electric lamp 36 which is suitably mounted in a socket 37 secured to said section. The conductor wires 38 of the lamp circuit pass through a suitable opening, as shown in Fig. 6, one of said wires being connected with a contact 39 in the form of a curved band which is secured to the periphery of a disk 40 of insulating material which is fixed to the spindle 21, as clearly shown in Figs. 2, 3 and 6. The other conductor wire is connected with a suitable source of electrical energy 41. Coöperating with the contact 39 is an angular resilient contact 42 which is secured to and insulated from the bracket arm 20. The contact 42 is connected with the source of energy 41 by means of a conductor wire 43. The arrangement is such that when the contact member 42 is in engagement with the contact 39, the circuit through the lamp 36 will be closed and effect lighting of the latter. When said contact 39 moves out of engagement with the contact 42, the lamp circuit will be broken. Said contacts 39 and 42 are so arranged that the circuit therethrough will be closed when the signaling member is in horizontal or stop signaling position, the circuit being automatically broken by movement of the contact 39 from engagement with the contact 42, when said signaling arm is rocked downwardly to vertical, or non-signaling position. A suitable housing 44 incloses said make-and-break mechanism, as clearly shown in Figs. 2, 3 and 6, for protection. Rocking of the signaling member is effected by means of a "Bowden" wire comprising the elongated flexible element 45 which is shiftably mounted in the flexible tubular casing 46. One end of the casing 46 is rigidly secured as by sweating to the front end of bracket section 12, as clearly shown in Fig. 5, the same extending rearwardly therefrom through the enlarged rearward portion of the slot 15 in bracket section 11, thence extending downwardly under the floor of the vehicle in connection with which the device is employed, being suitably fastened to the oscillatory brake pedal 47 of the vehicle, as clearly shown in Fig. 7. The member 45 is rigidly fastened at one end as by threading to a member 48 which is provided at the under edge of the signaling member, as clearly shown in Fig. 1, the opposite end of said member 45 being connected with a pedal 49 which is fulcrumed at 50 to a bracket 51 mounted upon the head of brake pedal 47, as clearly shown in Figs. 7, 8 and 9. A helical torsional spring 52 coöperates with the pedal 49 to normally hold the same in elevated position, said pedal in turn being adapted to shift the member 45 to one terminal of its movement in which the signaling member will be in vertical or non-signaling position. This being so, it will be seen that normally the signaling member will assume this position. To swing the signaling member to horizontal or signaling position, it is only necessary to depress the pedal 49, said depression effecting the shifting of the element 45 to in turn impart upward swinging to the signaling member. The pedal 49 is normally spaced above the head of pedal 47 so as to allow the foot to engage the pedal 47 without contacting with the pedal 49, thus permitting of operation of the brake pedal independently. When it is desired to simultaneously operate the signal pedal, it will be seen that this may be accomplished by engagement therewith, the arrangement being such that after the signal pedal has been depressed to operative position, the continued pressure of the foot will serve to also depress the brake pedal. In order to prevent slipping of the foot from the pedal 49, the same may be provided at the upper side of the free end thereof with a rubber block 53 secured in position for rotary adjustment by screw 54. Through the rotary adjustment afforded said block, when one side of the same becomes worn, said block may be turned in order to present another portion thereof less worn.

With the construction set forth then, it will be seen that, a signaling device is provided which may be readily and easily actuated by the same foot as is used in the actuation of the brake pedal, and it may be operated simultaneously with the actuation of the brake pedal if desired. The provision of an electric lamp in the signal arm adapts the device for use at night, the lamp being so connected as to be operated only when the signaling member is in signaling position. The signaling member may be provided with appropriate reading matter as indicated.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In a device of the class described, the combination with a vehicle having a pivotally mounted brake pedal, of a bracket mounted on said vehicle; a signaling member rockingly mounted in said bracket; a shiftably mounted elongated flexible element adapted, upon shifting movement, to actuate said signaling member; and a foot operable pedal for shifting said element, said last mentioned pedal being pivotally mounted on said brake pedal whereby either of said pedals may be operated independently or both operated simultaneously, substantially as described.

2. In a device of the class described, the combination with a vehicle, of a bracket comprising telescoping, longitudinally adjustable tubular sections, means on one of said sections for securing the same to a vehicle, said last mentioned section being provided with an aperture, a signaling member pivotally mounted on the other section, a brake pedal for said vehicle, a non-extensible flexible tubular element having one end fixed to said pedal and the other end extended through the aperture in the bracket section and fixed to the bracket section carrying the signaling member, a shiftable non-extensible element extending through the last mentioned element and having one end operably connected to said signaling member, an auxiliary pedal on said brake pedal and connected to the opposite end of the last mentioned element, substantially as described.

3. In a device of the class described, the combination with a vehicle, of a bracket comprising telescoping longitudinally adjustable tubular sections, means on one of said sections for securing the same to a vehicle, said last mentioned section being provided with an aperture, a signaling member pivotally mounted on the other section, a flexible tubular element having one end extended through the aperture in the bracket section and fixed to the other section and having its opposite end arranged adjacent the driver's seat, a flexible non-extensible element shiftably mounted in the last mentioned element and having one end connected to said signaling member and means adjacent the driver's seat and connected to the opposite end of said shiftable element for actuating the same, substantially as described.

4. In a device of the class described, the combination with a vehicle having a pivotally mounted brake pedal, of a signaling member rockingly mounted on said vehicle; a shiftably mounted elongated flexible element adapted, upon shifting movement, to push or pull said signaling member in rockingly actuating the same; a housing for said flexible element, one end of said housing being fixed to said pedal; and a foot-operable pedal carried by said brake pedal for shifting said flexible element, substantially as described.

5. In a device of the class described, the combination with a vehicle having a brake pedal, a movably mounted signaling member on said vehicle; a shiftably mounted elongated flexible element adapted, upon shifting movement, to actuate said signaling member; and a foot-operable pedal pivotally mounted on said brake pedal over one end of the top of the latter whereby said second mentioned pedal may be operated independently or simultaneously with said first mentioned pedal upon actuation of the latter, substantially as described.

In testimony whereof I have signed my name to this specification in the presence of two subscribing witnesses.

GUY W. COMER.

Witnesses:
  JOSHUA R. H. POTTS,
  HELEN F. LILLIS.